April 6, 1948.                W. A. SANDBERG                2,439,371
            GROUNDING SYSTEM FOR GAS TANK WELDERS
                Filed Oct. 3, 1947              2 Sheets-Sheet 2
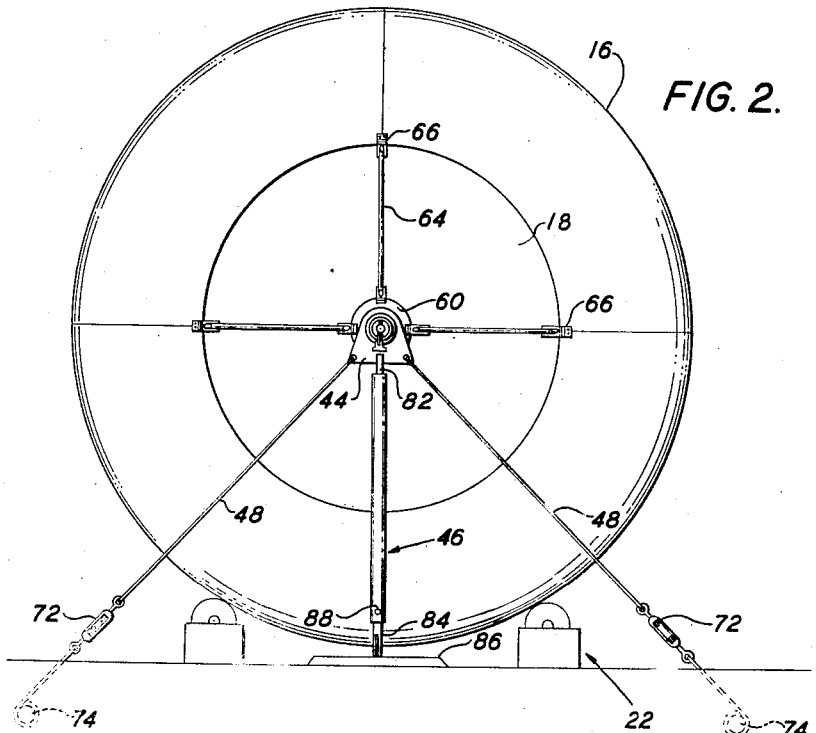
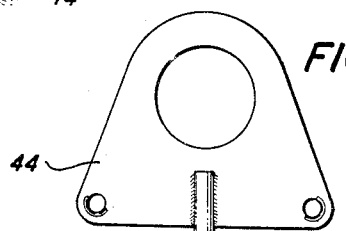
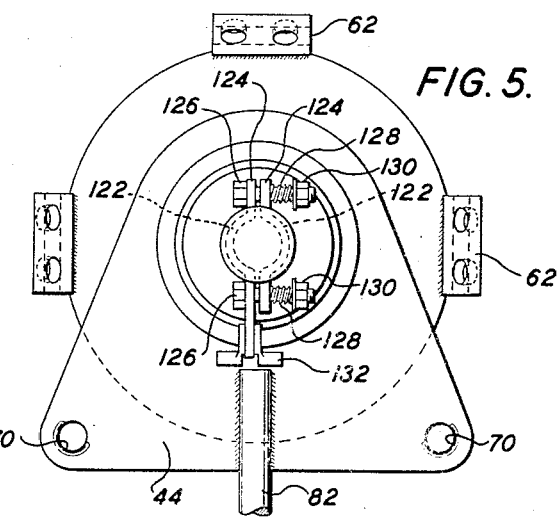
WILLIAM A. SANDBERG
         INVENTOR.

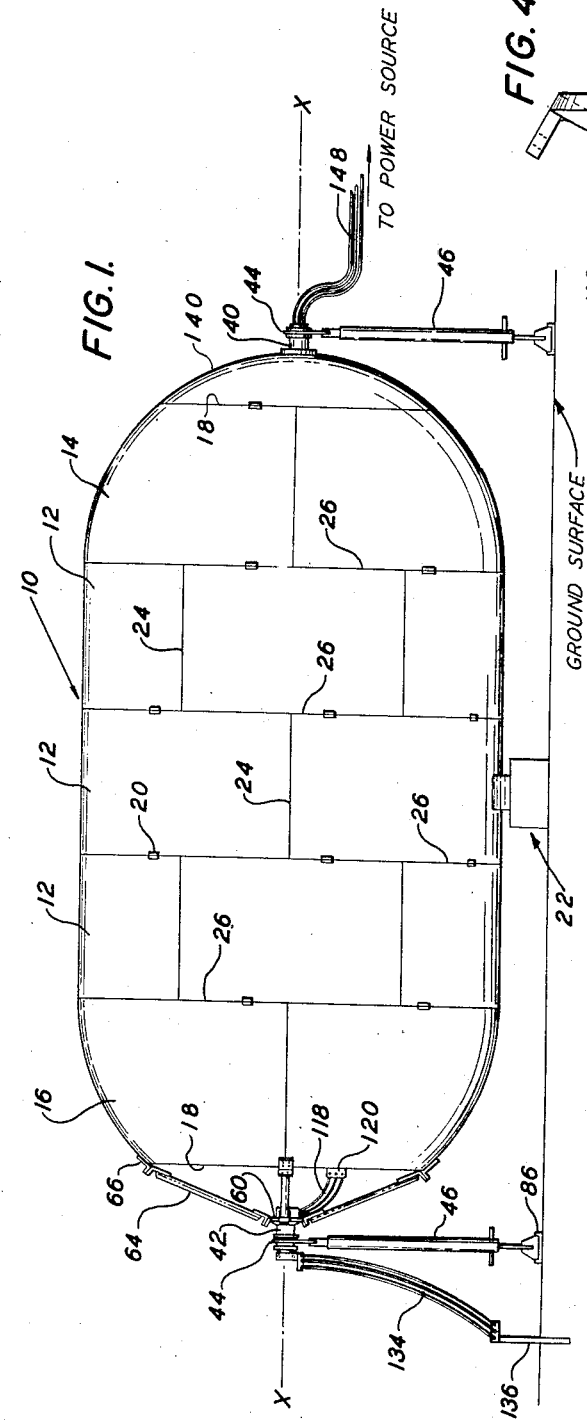
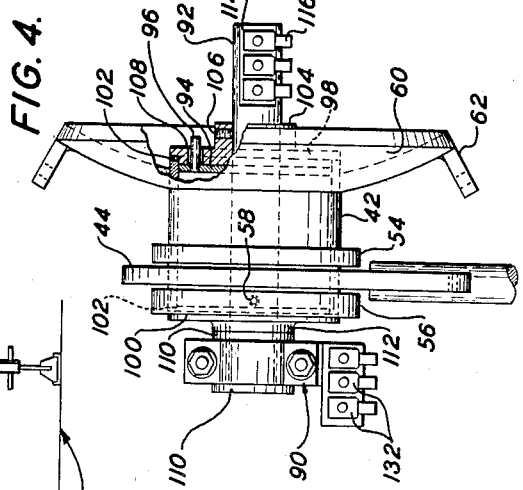
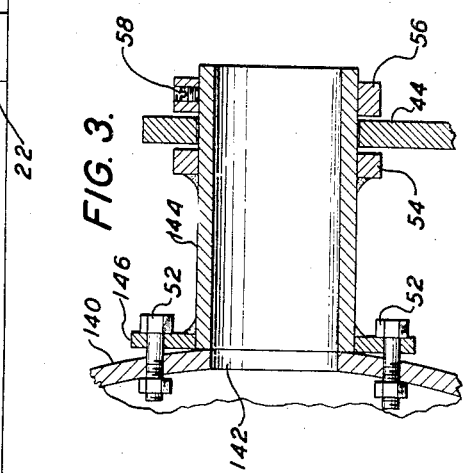

Patented Apr. 6, 1948

2,439,371

UNITED STATES PATENT OFFICE 2,439,371

GROUNDING SYSTEM FOR GAS TANK WELDERS

William A. Sandberg, Los Angeles, Calif., assignor to Lacy Manufacturing Company, Los Angeles, Calif., a corporation of California Application October 3, 1947, Serial No. 777,813

4 Claims. (Cl. 219—17)

Tanks of this type are customarily made up of a plurality of ring sections joined end-to-end and the head sections which are hemispherical or otherwise outwardly curved. The longitudinal seams may be riveted or welded and the rings containing such seams mounted in place. The roundabout seams between adjoining edges of the tank sections are preferably welded electrically, the welding operation being performed with the ring sections and head sections assembled in place and secured together as a unitary structure. In welding the roundabout seams, it is best to weld the seams on the interior side of the tank. From experience it is found that good practice requires that the seams be welded downhand. In order to facilitate downhand welding, the various sections of the tank are arranged for rotation in a cradle and the entire structure is rotated short distances at frequent intervals so as always to permit positioning the sections to be welded in a convenient location for downhand welding. A method and apparatus for assembling and rotating the tank structure in place is described in detail in the Patent No. 2,287,197, which issued to me June 23, 1942.

In the welding procedure, the electrical leads for the welding apparatus employed are generally led into the tank structure through one end or the other, or both, as may be convenient. As a safety precaution and for most efficient operation, it is found desirable to ground the tank sections. Heretofore, it has been common practice to make the ground connection by attaching cables to convenient points on the shell. This practice is a source of considerable inconvenience as the cables are likely to snarl unless the points of connection are changed as the tank is revolved during construction.

Accordingly, the principal object of this invention is to provide an improved grounding system for use in welding such tanks.

Other objects of this invention will appear from the following description taken in connection with the accompanying drawings, wherein:

Fig. 1 is a side elevational view of a cylindrical tank to which my invention is applied;

Fig. 2 is a front end elevational view of the tank of Fig. 1;

Fig. 3 is a fragmentary sectional view of the tube through which power leads are admitted after one head is closed;

Fig. 4 is an enlarged detailed side view of the electrical grounding system;

Fig. 5 is an enlarged detailed front view of the front end of the electrical grounding system; and Fig. 6 is an enlarged detailed view showing the anchor column.

Fig. 1 illustrates the tank structure 10 in a somewhat advanced stage of construction. The tank consists of a plurality of ring sections 12, of sheet steel, and head sections 14 and 16 which, during the construction period, have centrally located openings 18 of liberal dimensions for ventilation. The ring sections, prior to welding, are held together by bolted clips 20, in the conventional manner, so that the entire tank structure may be rotated as a unit around its axis X—X to permit downhand welding. The tank structure is rotatably supported on one or more pairs of rollers 22, mounted beneath the tank on opposite sides of its center line. Ordinarily, but not necessarily, the longitudinal seams 24 will have been welded before the ring sections are assembled while the roundabout welds 26 are still to be made.

Until the tank reaches that stage of construction at which it is desired to close in the ends, each of the openings 18 is provided with the structure shown at the left-hand end of Fig. 1 and which will now be described with reference to Figs. 1, 2, 3 and 6.

A journal tube 42 is arranged to rotate in a centering plate 44 which is positioned by means of an adjustable center anchor column 46 and two adjustable cables or guy wires 48. The inner end of tube 42 carries a dished flange 60 provided with forwardly projected lugs 62. These lugs are bolted to a plurality of radius rods 64 extending outwardly to brackets 66 which are bolted around the edge of opening 18. The radius arms are of such length and are so inclined to the axis of the tank as to bring tube 42 into alignment with the axis X—X of the tank and into a position beyond the end of the tank structure. The centering plate 44 is retained in a position normal to the axis by a collar 54 welded to tube 42 and a collar 56 removably retained by set screws 58. It will be understood that as the tank rotates around its axis, tube 42 rotates while centering plate 44 is stationary.

The centering plate is provided with openings 70 for the attachment of the guy lines 48, each of these lines having a turnbuckle 72 for adjusting its length, the lower ends of the guy lines being fastened to buried anchors 74.

Each of the center anchor columns 46 includes a tube 76 which terminates at opposite ends in oppositely threaded cap pieces 78 and 80 which are welded therein. The upper cap piece 78 threadably engages a threaded rod 82 which is welded to the base of the corresponding centering plate 44. The bottom cap piece 80 threadably engages a threaded rod 84 which is welded to a foot anchor 86 which is buried in the ground. Outwardly extending arms 88 welded to each of the tubes are employed for rotating the tubes in order to adjust the heights of the corresponding center plates 44. The turnbuckles 72 in the cables 48 are also adjusted in order to hold the center plates 44 firmly against transverse horizontal movement.

With the arrangement described hereinabove, the tank structure 10 is free to rotate as a unit in the cradle 22 without disturbing the alignment of tube 42.

According to the present invention, the tank structure 10 is grounded by means of a sliding contact or terminal 90 which is rotatable upon the outermost end of a contact rod 92, firmly and centrally secured within the front tube 42. More particularly, an end plate 94 provided with rearwardly projecting pins 96 is welded within the front tube 42 and two alignment caps 98 and 100 are respectively positioned on the front and rear ends of the front tube. The two alignment caps are provided with steps 102 which serve to keep them centered within the tube 42. The end plate 94 and the alignment caps 98 and 100 are provided with coaxial central bores for receiving the contact rod 92. The rear alignment cap 98 is provided with a rearwardly extending hub 104 through which a set screw 106 passes radially in order to hold the contact rod 92 firmly. The rear alignment cap 98 is also provided with holes 108 which register with the pins 96 so that the contact rod 92 rotates with the tube 42 and hence with the tank structure 10.

The contact rod 92 itself is provided with two collars 110, one being at the outermost end of the rod. A hub 112 extending forwardly of the front alignment cap 100 serves to position the forward end of the contact rod 92. The inner end of the contact rod is provided with two parallel flat surfaces 114 on opposite sides thereof to which one or more pairs of lugs 116 are attached. Grounding conductors 118 are employed which are attached to these lugs at one end and attached to a bracket 120 firmly secured to the front head-section 16 at the other end. The electrical contact of this conductor 118 with the remaining sections 12 and 14 is completed through the bolt clips 20 and any completed seams 26.

The sliding contact 90 is in the form of a resilient split ring clamp comprising two substantially semicircular ring segments 122. These segments are provided with opposing pairs of outwardly extending arms 124 which are resiliently fastened together by means of bolts 126 passing therethrough and springs 128 arranged about the bolts between the arms of one segment and nuts 130. One arm of one segment 122 is extended downwardly and is provided with pairs of lugs 132 at its lowermost end. Grounding cables 134 are attached at one end to these lugs 132 and at the opposite end to a well-anchored electrical ground 136. Preferably, the terminal 90 and the contact rod are made of copper.

During the welding up of the shell seams it is desirable to leave the ends open for ventilation of the interior of the tank. During this period the end of the tank opposite to that at which the grounding leads are attached is provided with the flange 62, radius rods 64, centering plate 44, anchor column 46 and guy wires 48. In place of the sliding contact 90 and associated parts shown in Fig. 4, the flange carries merely the tube and associated parts shown in Fig. 3.

Referring to this figure, the plate 140, which is the equivalent of flange 62 of Fig. 4, has a central opening 142. A tube 144 having an end flange 146 is projected from this opening and is retained on plate 140 by a flange 146 and bolts 52 or by tack welding. The outer end of the tube carries collars 54 and 56 already described, the centering plate 44 being positioned between them. The power leads 148 to the welding apparatus are carried loosely through tube 144 as may be required.

After completion of the welding of the shell the radius rods 64 and flange 62 are removed and flange 146 is attached over an opening 142 in the end section 140 to admit the power leads while the end seams are being welded to close in the tank.

The principal purpose of the anchor columns and guy wires is to provide against accidental tilting of the tank when supported on a single pair of rollers 22. Such tilting is not likely to occur, but the provision of the anchors adds to the security of operators working within the tank.

The further use for the guy wires is to permit the tank to be skewed to move it endwise on the rollers. By slackening off one guy line and tightening the line at the opposite corner, the axis of the tank may be skewed with relation to the plane of rotation of the rollers. On then rotating the tank on its own axis it may be moved endwise to any distance which the end attachments will permit, an operation which is difficult to perform in any other manner. The tank may thus be moved horizontally through a distance of several inches in a very short time and with little labor.

I claim as my invention:

1. In apparatus for electrically welding seams of a cylindrical tank structure comprising metal ring sections and at least one centrally open metal head section all secured together and mounted for rotation in a cradle about a horizontal axis, the improved electrical grounding system which comprises a conductor rod firmly mounted on said head section coaxially with said tank and in electrical communication with said sections, a conductor terminal arranged to be maintained in sliding contact with said conductor as said tank is rotated to facilitate welding the seams, and a grounding conductor connected at one end to said conductor terminal and at the other end to ground.

2. Apparatus as defined in claim 1, wherein said conductor terminal comprises a plurality of ring segments embracing said rod and resilient means for pressing said ring segments radially inward against said rod as it rotates.

3. In a system for electrically welding seams of a cylindrical tank structure comprising metal ring sections and at least one centrally open metal head section all secured together and mounted for rotation in a cradle about a horizontal axis, the improved electrical grounding system which comprises a tubular member, a plurality of radius arms for supporting said tubular member on said head section and projecting therefrom, centering means including a centering plate rotatably mounted on said tubular member and including adjustable guide wires and an adjustable anchor column for positioning said plate relative to the cradle, said radius arms and said centering means supporting said tubular member coaxially with said tank structure, a conductor rod firmly mounted within said tubular member and projecting outwardly therefrom, a first grounding conductor for electrically connecting the inner end of said conductor rod with said tank sections, a conductor terminal arranged to be maintained in sliding contact with the outer end of said conductor rod as said tank is rotated to facilitate welding the seams, and a second grounding conductor for electrically connecting said second grounding conductor to the ground.

4. Apparatus as defined in claim 3, wherein said conductor terminal comprises a plurality of ring segments embracing said rod and resilient means for pressing said ring segments radially inward against said rod as it rotates, and comprising a first pair of collars arranged on said tubular member on opposite sides of said centering plate for constraining said plate axially and a second pair of collars arranged on the outer end of said conductor rod and on opposite sides of said grounding terminal for constraining said grounding terminal axially.

WILLIAM A. SANDBERG.